(12) United States Patent
Nishimura et al.

(10) Patent No.: US 11,830,445 B2
(45) Date of Patent: Nov. 28, 2023

(54) SYSTEM, INFORMATION PROCESSING APPARATUS, AND NON-TRANSITORY STORAGE MEDIUM

(71) Applicant: TOYOTA JIDOSHA KABUSHIKI KAISHA, Toyota (JP)

(72) Inventors: Kazuya Nishimura, Anjo (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 17/099,934

(22) Filed: Nov. 17, 2020

(65) Prior Publication Data

US 2021/0158765 A1   May 27, 2021

(30) Foreign Application Priority Data

Nov. 22, 2019   (JP) ................... 2019-211781

(51) Int. Cl.
| | |
|---|---|
| *B60Q 3/18* | (2017.01) |
| *G09G 3/34* | (2006.01) |
| *B60Q 1/14* | (2006.01) |
| *G07C 5/00* | (2006.01) |
| *B60Q 3/80* | (2017.01) |
| *B60J 3/04* | (2006.01) |

(Continued)

(52) U.S. Cl.
CPC .............. *G09G 3/3406* (2013.01); *B60J 3/04* (2013.01); *B60Q 1/1423* (2013.01); *B60Q 3/00* (2013.01); *B60Q 3/208* (2017.02); *B60Q 3/74* (2017.02); *B60Q 3/80* (2017.02); *G01J 1/18* (2013.01); *G07C 5/008* (2013.01); *F21V 14/00* (2013.01)

(58) Field of Classification Search
CPC ........ G09G 3/3406; B60Q 3/208; B60Q 3/80; B60Q 3/74; B60Q 3/00; B60Q 1/1423; B60J 3/04; G01J 1/18; G07C 5/008; F21V 14/00
See application file for complete search history.

(56) References Cited

U.S. PATENT DOCUMENTS

2015/0170429 A1\* 6/2015 Denny .................. B60W 30/09
701/1

FOREIGN PATENT DOCUMENTS

| JP | 2004-182006 A | 7/2004 |
|---|---|---|
| JP | 2019-139609 A | 8/2019 |

(Continued)

*Primary Examiner* — Henry Luong
(74) *Attorney, Agent, or Firm* — Oliff PLC

(57) ABSTRACT

To more appropriately adjust the brightness inside a vehicle. Provided is a system including: a first vehicle configured to output, to a server, information regarding illuminance of light incident on a vehicle by associating with information regarding a traveling environment; a second vehicle configured to output information regarding a traveling environment to the server; and the server including a controller configured to generate, based on the information regarding the illuminance of the light incident on the first vehicle, information regarding a sudden-change point that is a point at which a change amount of the illuminance of the light incident on the first vehicle exceeds a prescribed value, and configured to output, based on the information regarding the traveling environment of the second vehicle acquired from the second vehicle, information regarding the sudden-change point to the second vehicle.

17 Claims, 10 Drawing Sheets

(51) Int. Cl.
  *G01J 1/18* (2006.01)
  *B60Q 3/74* (2017.01)
  *B60Q 3/208* (2017.01)
  *B60Q 3/00* (2017.01)
  *F21V 14/00* (2018.01)

(56) References Cited

FOREIGN PATENT DOCUMENTS

| | | | |
|---|---|---|---|
| JP | 2019-189193 A | | 10/2019 |
| JP | 2019189193 A | * | 10/2019 |

* cited by examiner

| VEHICLE ID | DATE/TIME | LOCATION | TRAVELING ROUTE | WEATHER |
|---|---|---|---|---|
| V01 | T10 | L01 | R01 | SUNNY |
| V02 | T20 | L02 | R02 | SUNNY |
| V03 | T30 | L03 | R03 | CLOUDY |
| V04 | T40 | L04 | R04 | RAINY |
| V05 | T50 | L05 | R05 | RAINY |
| ... | ... | ... | ... | ... |

Fig. 6

| VEHICLE ID | DATE/TIME | LOCATION | ILLUMINANCE |
|---|---|---|---|
| V11 | T11 | L01 | D01 |
| V12 | T21 | L02 | D02 |
| V13 | T31 | L03 | D03 |
| V14 | T41 | L04 | D04 |
| V15 | T51 | L05 | D05 |
| ... | ... | ... | ... |

Fig. 7

| SUDDEN -CHANGE POINT ID | DATE /TIME | LOCATION | DIRECTION | CHANGE AMOUNT | WEATHER |
|---|---|---|---|---|---|
| E01 | T11 | L01 | F01 | G01 | SUNNY |
| E02 | T21 | L02 | F02 | G02 | SUNNY |
| E03 | T31 | L03 | F03 | G03 | CLOUDY |
| E04 | T41 | L04 | F04 | G04 | RAINY |
| E05 | T51 | L05 | F05 | G05 | RAINY |
| ... | ... | ... | ... | ... | ... |

Fig. 8

SYSTEM, INFORMATION PROCESSING APPARATUS, AND NON-TRANSITORY STORAGE MEDIUM

CROSS REFERENCE TO RELATED APPLICATION

This application claims the benefit of Japanese Patent Application No. 2019-211781, filed on Nov. 22, 2019, which is hereby incorporated by reference herein in its entirety.

BACKGROUND

Technical Field

The present disclosure relates to a system, an information processing apparatus, and a non-transitory storage medium.

Description of the Related Art

There is known a technique that changes the transmittance of car windows before entering a tunnel or before going out from the tunnel (for example, see Patent document 1).

CITATION LIST

Patent Document

Patent document 1: Japanese Patent Laid-Open No. 2004-182006

SUMMARY

Other than the case of tunnels, there may also be cases where the illuminance of light incident on and goes into inside of a vehicle changes. However, the conventional technique cannot be applied to the cases other than the tunnels.

The object of the present disclosure is to adjust the brightness inside the vehicles more appropriately.

An aspect of the present disclosure is a system that includes: a first vehicle configured to output, to a server, information regarding illuminance of light incident on a vehicle by associating with information regarding a traveling environment; a second vehicle configured to output information regarding a traveling environment to the server; and the server including a controller configured to generate, based on the information regarding the illuminance of the light incident on the first vehicle, information regarding a sudden-change point that is a point at which a change amount of the illuminance of the light incident on the first vehicle exceeds a prescribed value, and configured to output, based on the information regarding the traveling environment of the second vehicle acquired from the second vehicle, information regarding the sudden-change point to the second vehicle.

An aspect of the present disclosure is an information processing apparatus that includes a controller configured to: acquire, from a first vehicle, information regarding illuminance of light incident on the first vehicle associated with information regarding a traveling environment; generate, based on the acquired information regarding the illuminance of the light incident on the first vehicle, information regarding a sudden-change point that is a point at which a change amount of the illuminance of the light incident on the first vehicle exceeds a prescribed value; and output, based on information regarding a traveling environment of a second vehicle acquired from the second vehicle, information regarding the sudden-change point to the second vehicle.

An aspect of the present disclosure is a non-transitory storage medium including a program stored therein, the program causing a computer to: acquire, from a first vehicle, information regarding illuminance of light incident on the first vehicle associated with information regarding a traveling environment; generate, based on the acquired information regarding the illuminance of the light incident on the first vehicle, information regarding a sudden-change point that is a point at which a change amount of the illuminance of the light incident on the first vehicle exceeds a prescribed value; and output, based on information regarding a traveling environment of a second vehicle acquired from the second vehicle, information regarding the sudden-change point to the second vehicle.

Further, another aspect of the present disclosure is the program stored in the non-transitory storage medium or an information processing method executed by the computer by using the program.

According to the present disclosure, the brightness inside the vehicle can be adjusted more appropriately.

BRIEF DESCRIPTION OF THE DRAWINGS

FIG. 6 is a chart illustrating an example of a configuration of a table of second vehicle information;

FIG. 7 is a chart illustrating an example of a configuration of a table of first vehicle information;

FIG. 8 is a chart illustrating an example of a configuration of a table of sudden-change point information;

DESCRIPTION OF THE EMBODIMENTS

Figure 1:
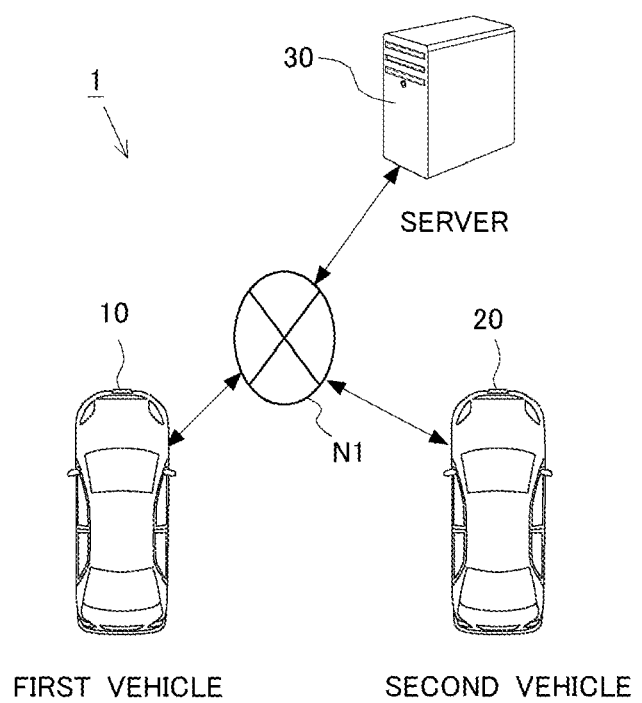
FIG. 1 is a diagram illustrating a schematic configuration of a system according to an embodiment.

In a system as an aspect of the present disclosure, a first vehicle collects information regarding illuminance, and a server generates information regarding a point where the illuminance suddenly changes (sudden-change point). Then, the server provides the information regarding the sudden-change point to a second vehicle. The first vehicle outputs the information regarding the illuminance by associating it with information regarding a traveling environment of the first vehicle. Note here that the information regarding the traveling environment is the information related to the illuminance of light incident on the vehicle, and examples thereof may be information regarding location and information regarding date/time. Further, information regarding the weather may be included in the information regarding the traveling environment. The illuminance is associated with the traveling environment so that the information regarding the illuminance of the light incident on the vehicle can be specified based on the information regarding the traveling environment. The server generates the information regarding the sudden-change point that is the point at which a change amount of the illuminance of the light incident on the first vehicle exceeds a prescribed value. The prescribed value is the change amount of the illuminance within a range with which the driver of the second vehicle does not feel dazzling or dimness or with which it is not significant even if the driver feels so. In a case where the illuminance increases at the sudden-change point, the value acquired by subtracting the illuminance before passing through the sudden-change point from the illuminance after passing through the sudden-change point may be taken as the change amount. In the meantime, in a case where the illuminance decreases at the sudden-change point, the value acquired by subtracting the illuminance after passing through the sudden-change point from the illuminance before passing through the sudden-change point may be taken as the change amount. Further, the change amount may be expressed as an absolute value of the value acquired by subtracting the illuminance before passing through the sudden-change point from the illuminance after passing through the sudden-change point. The server generates the information regarding the sudden-change point. The information regarding the sudden-change point may include information of the date/time, the location, the traveling direction of the first vehicle, the change amount of the illuminance, the weather, and the like, for example. The generated information regarding the sudden-change point may be stored in a main memory, for example.

The server acquires information regarding a traveling environment from the second vehicle. Then, the server outputs, to the second vehicle, the information regarding the sudden-change point corresponding to the information regarding the traveling environment of the second vehicle. The sudden-change point corresponding to the information regarding the traveling environment of the second vehicle is the point at which the change amount of the illuminance of the light incident on the second vehicle exceeds the prescribed value when the second vehicle passes through the sudden-change point, for example. For example, when the date/time on which the second vehicle passes through the point is different even if it is the point at which the change amount of the illuminance of the light incident on the first vehicle exceeds the prescribed value, the change amount of the illuminance of the light incident on the second vehicle may become equal to or less than the prescribed value. Therefore, the information regarding the sudden-change point for the second vehicle is outputted based on the information regarding the traveling environment of the second vehicle so as to output the information regarding the point at which the change amount of the illuminance of the light incident on the second vehicle exceeds the prescribed value. As described, through generating, by the server, the information regarding the traveling environment by associating with the sudden-change point, the information regarding the sudden-change point can be provided thereafter to the vehicles under a similar traveling environment before the vehicles actually passes through the sudden-change point. Therefore, before the second vehicle passes through the sudden-change point, the brightness inside the vehicle can be adjusted more appropriately.

The second vehicle may include: a changer that changes the illuminance inside the second vehicle; and an adjuster that controls the changer based on the information regarding the sudden-change point outputted from the server. In the second vehicle, by controlling the changer by the adjuster based on the information regarding the sudden-change point acquired in advance, the brightness inside the second vehicle can be adjusted in advance according to the change in the illuminance at the sudden-change point. This makes it possible to suppress dazzling or dimness felt by the driver of the second vehicle at the time of the change in the illuminance when the second vehicle passes through the sudden-change point.

The adjuster may control the changer such that the illuminance inside the second vehicle changes in a prescribed area before the second vehicle passes through the sudden-change point, and may control the changer such that the second vehicle retunes to the state of the changer that is before the second vehicle enters the prescribed area after the second vehicle has passed through the sudden-change point. The prescribed area can be defined according to the distance or the time required for allowing the eyes of the driver of the second vehicle to be adapted to the illuminance felt after passing through the sudden-change point. The prescribed area may be changed according to the change amount of the illuminance at the sudden-change point. By changing the illuminance inside the second vehicle by the adjuster while the second vehicle is traveling in the prescribed area, it is possible before passing through the sudden-change point to allow the eyes of the driver to be adapted to the illuminance felt after passing through the sudden-change point. In the meantime, after the second vehicle passes through the sudden-change point, the adjuster returns the state of the changer to the state thereof before entering the prescribed area. That is, the eyes of the driver is adapted to the suddenly changed illuminance after passing through the sudden-change point. Therefore, it is unnecessary to change the illuminance by the changer, so that the state of the changer is returned to the original state.

In a case where the change amount at the sudden-change point is a change amount on an increasing side, the adjuster may control the changer such that the illuminance inside the second vehicle before the second vehicle passes through the sudden-change point in the prescribed area becomes higher than the illuminance before the second vehicle enters the prescribed area. The case where the change amount at the sudden-change point is the change amount on the increasing side is the case where the inside the second vehicle gets suddenly bright at the sudden-change point. When the illuminance changes to the increasing side at the sudden-change point, it is concerned that the driver of the second vehicle may feel dazzling when passing through the sudden-change point. For dealing with that, by increasing the illuminance inside the vehicle before passing through the sudden-change point, it is possible to suppress dazzling felt by the driver when the second vehicle passes through the sudden-change point.

In a case where the change amount at the sudden-change point is a change amount on the increasing side, the adjuster may control the changer such that the illuminance inside the second vehicle gradually increases before the second vehicle passes through the sudden-change point. If the illuminance inside the second vehicle is suddenly increased, the driver may feel dazzling thereby. On the contrary, by gradually increasing the brightness inside the second vehicle before passing through the sudden-change point, it is possible to suppress dazzling felt by the driver at that time.

The changer may include an interior light that illuminates inside the second vehicle. By turning on the interior light, the illuminance inside the second vehicle can be increased.

In a case where the change amount at the sudden-change point is a change amount on the increasing side, the adjuster may turn on the interior light before the second vehicle passes through the sudden-change point. By turning on the interior light in the second vehicle, the brightness inside the second vehicle can be increased. Therefore, by turning on the interior light before the illuminance increases at the sudden-change point, it is possible to allow the eyes of the driver to be adapted to a state of still higher illuminance. Note that the brightness of the interior light may also be increased gradually.

The adjuster may turn off the interior light after the second vehicle passes through the sudden-change point. It becomes unnecessary to adjust the illuminance inside the second vehicle after passing through the sudden-change point, so that the interior light may be turned off. This makes it possible to suppress an excessive increase in the illuminance inside the second vehicle.

In a case where the change amount at the sudden-change point is a change amount on a decreasing side, the adjuster may control the changer such that the illuminance inside the second vehicle before the second vehicle passes through the sudden-change point in the prescribed area becomes lower than the illuminance before the second vehicle enters the prescribed area. The case where the change amount at the sudden-change point is the change amount on the decreasing side is the case where the inside the second vehicle gets suddenly dim at the sudden-change point. When the illuminance changes to the decreasing side at the sudden-change point, it is concerned that the driver of the second vehicle may feel dimness when passing through the sudden-change point. For dealing with that, by decreasing the illuminance inside the vehicle before passing through the sudden-change point, it is possible to suppress dimness felt by the driver when the second vehicle passes through the sudden-change point.

In a case where the change amount at the sudden-change point is a change amount on the decreasing side, the adjuster may control the changer such that the illuminance inside the second vehicle gradually decreases before the second vehicle passes through the sudden-change point. If the illuminance inside the second vehicle is suddenly decreased, the driver may feel dimness thereby. On the contrary, by gradually decreasing the brightness inside the second vehicle before passing through the sudden-change point, it is possible to suppress dimness felt by the driver at that time.

The changer may include light-control glass. The light-control glass is glass capable of changing the transmittance of light. The light-control glass may be used for a windshield, side-window glass, rear-window glass, a sunroof, and the like. By changing the transmittance of light in the light-control glass, the brightness (dimness) inside the second vehicle can be adjusted. That is, the lower the transmittance of light, the lower the illuminance inside the second vehicle can be.

In a case where the change amount at the sudden-change point is a change amount on the decreasing side, the adjuster may decrease the transmittance of the light-control glass before the second vehicle passes through the sudden-change point to be smaller than the transmittance after the second vehicle passes through the sudden-change point. By decreasing the brightness inside the second vehicle through decreasing the transmittance of the light-control glass before passing through the sudden-change point, it is possible to allow the eyes of the driver of the second vehicle to be adapted to the illuminance felt after passing through the sudden-change point. Therefore, it is possible to suppress dimness felt by the driver after the second vehicle passes through the sudden-change point.

The adjuster may maximize the transmittance of the light-control glass after the second vehicle passes through the sudden-change point. It becomes unnecessary to adjust the illuminance inside the second vehicle after passing through the sudden-change point, so that it is unnecessary to decrease the illuminance by the light-control glass. Further, by maximizing the transmittance of the light-control glass after passing through the sudden-change point, it becomes possible to suppress an excessive decrease in the illuminance inside the second vehicle.

The second vehicle may include an output unit that outputs information regarding the sudden-change point when the information regarding the sudden-change point is acquired. By outputting the information regarding the sudden-change point to the output unit, presence of the sudden-change point can be notified to the driver. Thereby, the driver can prepare for the sudden change in the illuminance. Note that both changing the illuminance by the changer and outputting the information regarding the sudden-change point by the output unit may be performed or either one of those may be performed.

The first vehicle may include a photodetector that detects the light incident on the first vehicle. The photodetector is a sensor in which a voltage or a current is generated according to light, for example. By providing the photodetector, the first vehicle can acquire the illuminance of the light incident on the first vehicle and output it to the server.

As the information regarding the traveling environment of the first vehicle, a controller may acquire information including information regarding the location of the first vehicle, information regarding the date/time on which the information regarding the location of the first vehicle is acquired, and information regarding the weather corresponding to the location of the first vehicle. All of the information regarding the location of the first vehicle, the information regarding the date/time on which the information regarding the location of the first vehicle is acquired, and the information regarding the weather corresponding to the location of the first vehicle are information regarding the sudden-change point. For example, it is possible to grasp the location of the sudden-change point and the traveling direction of the first vehicle passing through the sudden-change point based on the information regarding the location of the first vehicle. Further, the sudden-change point is affected by the date/time and the weather. For example, even at a same location, the relative position of the sun changes depending on the date/time, so that the brightness inside the vehicle may change depending on the date/time. Further, even at a same location, the brightness inside the vehicle may change depending on the weather, for example. Note that the information regarding the date/time and the information regarding the weather may be outputted from the first vehicle or may be outputted from another server or the like. When the server acquires such information regarding the traveling environment of the first vehicle, the server can grasp the location, the date/time, and the weather with which such sudden-change point appears.

As the information regarding the traveling environment information of the second vehicle, the controller may acquire information including information regarding the location of the second vehicle, information regarding the traveling route of the second vehicle, information regarding the date/time on which the information regarding the location of the second vehicle is acquired, and information regarding the weather corresponding to the location of the second vehicle. If the traveling environments of the first vehicle and the second vehicle are the same or in a reasonable range that can be considered the same, the illuminance of the light incident on the vehicles becomes about the same level. Therefore, if the traveling environment of the second vehicle is equivalent to the traveling environment of the first vehicle under which the sudden-change point appeared in the first vehicle, it can be estimated that the sudden-change point will appear also in the second vehicle. If the controller acquires the traveling route of the second vehicle in advance, it is possible to determine whether or not the second vehicle passes through the sudden-change point. Further, it is possible to predict the date/time on which the second vehicle passes through the sudden-change point and the weather thereof. Therefore, the controller can determine in advance whether or not the sudden-change point appears in the second vehicle by acquiring the information regarding the traveling environment of the second vehicle.

Hereinafter, embodiments of the present disclosure will be described by referring to the accompanying drawings. Configurations of the embodiments provided hereinafter are examples, and the present disclosure is not limited to the configurations of the embodiments. Further, the embodiments hereinafter can be combined as appropriate.

First Embodiment

FIG. 1 is a diagram illustrating a schematic configuration of a system 1 according to the embodiment. The system 1 illustrated in FIG. 1 includes a first vehicle 10, a second vehicle 20, and a server 30. The first vehicle 10 acquires information regarding the illuminance of light incident on the first vehicle 10, and transmits the information to the server 30. Then, the server 30 generates information regarding a point at which a change amount of the illuminance acquired by the first vehicle 10 exceeds a prescribed value (also referred to as a sudden-change point hereinafter), and provides it to the second vehicle 20. In the second vehicle 20, according to the information regarding the sudden-change point, notification may be made before passing through the sudden-change point or the brightness inside the vehicle may be adjusted before passing through the sudden-change point, for example. Note that the sudden-change point may have a range (distance) of some extent. That is, if a change amount in the illuminance when the first vehicle 10 travels a distance of some extent exceeds a prescribed value, it may be considered as a sudden-change point. The first vehicle 10 is an example of the first vehicle, and the second vehicle 20 is an example of the second vehicle.

The first vehicle 10, the second vehicle 20, and the server 30 are mutually connected via a network N1. The network N1 is a worldwide public communication network such as the Internet, and WAN (Wide Area Network) or other communication networks may be employed as well. Further, the network N1 may include a telephone communication network for mobile phones and the like and a wireless communication network such as Wi-Fi®. While a single first vehicle 10 is illustrated in FIG. 1 as an example, there may also be a plurality of first vehicles 10. Further, there may also be a plurality of second vehicles 20. Furthermore, a same vehicle may have functions of both the first vehicle 10 and the second vehicle 20.

(Hardware Configuration)

Figure 2:
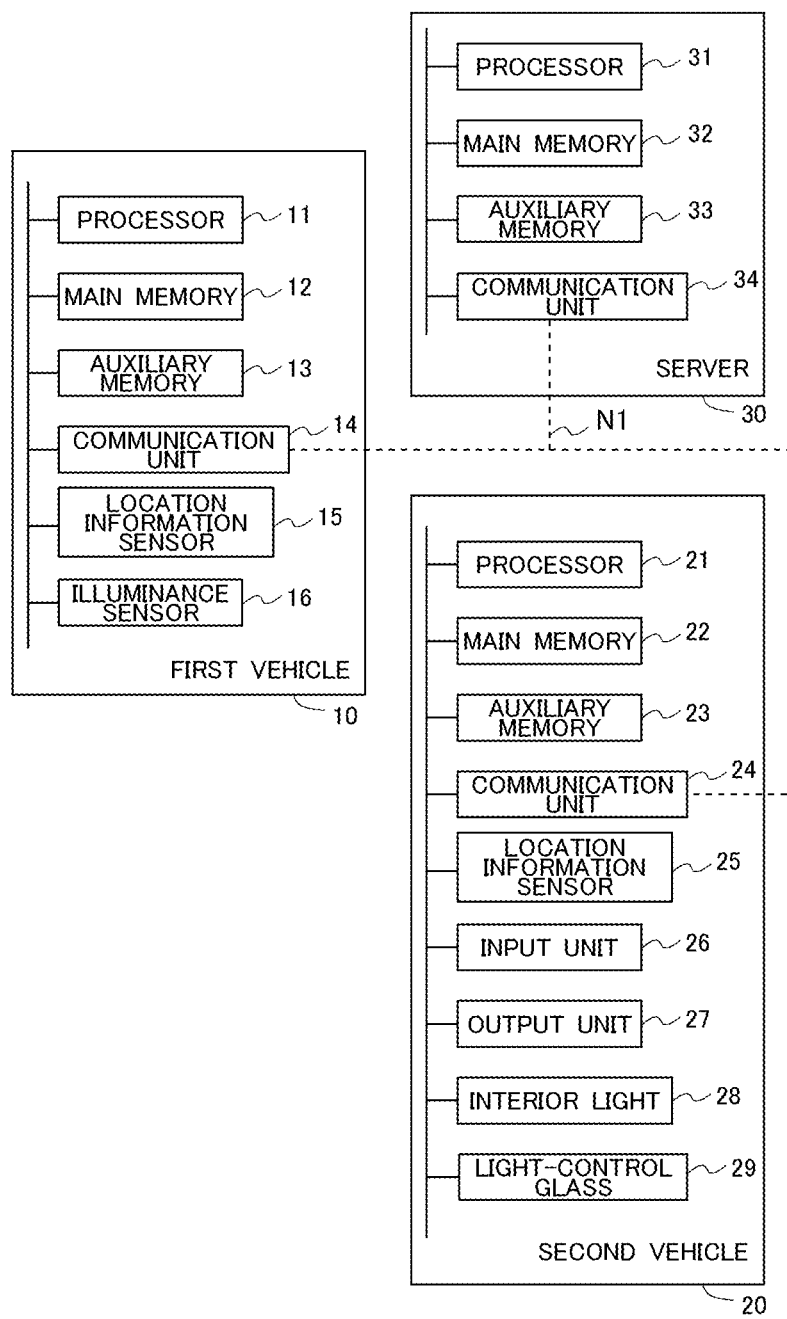
FIG. 2 is a block diagram schematically illustrating examples of configurations of each of a first vehicle, a second vehicle, and a server configuring the system according to the embodiment.

Next, referring to FIG. 2, hardware configurations of the first vehicle 10, the second vehicle 20, and the server 30 will be described. FIG. 2 is a block diagram schematically illustrating examples of the configurations of each of the first vehicle 10, the second vehicle 20, and the server 30 configuring the system 1 according to the embodiment.

The first vehicle 10 includes a processor 11, a main memory 12, an auxiliary memory 13, a communication unit 14, a location information sensor 15, and an illuminance sensor 16. Those are mutually connected via a bus. The processor 11 is a CPU (Central Processing Unit), a DSP (Digital Signal Processor), or the like. The processor 11 performs arithmetic operations of various kinds of information processing for controlling the first vehicle 10.

The main memory 12 is a RAM (Random Access Memory), a ROM (Read Only Memory), or the like. The auxiliary memory 13 is an EPROM (Erasable Programmable ROM), an HDD (Hard Disk Drive), a removable medium, or the like. In the auxiliary memory 13, an OS (Operating System), various kinds of programs, various kinds of tables, and the like are stored. The processor 11 loads and executes the programs stored in the auxiliary memory 13 on a work area of the main memory 12, and each of components and the like are controlled through execution of the programs. The main memory 12 and the auxiliary memory 13 are recording media that can be read by computers. The configurations illustrated in FIG. 2 may be achieved by a plurality of computers working in cooperation. Further, the information stored in the auxiliary memory 13 may be stored in the main memory 12. Furthermore, the information stored in the main memory 12 may be stored in the auxiliary memory 13.

The communication unit 14 is communication means for connecting the first vehicle 10 to the network N1. The communication unit 14 is a circuit for communicating with other devices (for example, the server 30 and the like) via the network N1 by utilizing a wireless communication network such as a mobile communication service (for example, a telephone communication network such as 5G (5th Generation), 4G (4th Generation), 3G (3rd Generation), or LTE (Long Term Evolution)), Wi-Fi®, or the like.

The location information sensor 15 acquires the location information (for example, latitude, longitude) of the first vehicle 10 at a prescribed period. Examples of the location information sensor 15 are a GPS (Global Positioning System) reception unit, a wireless LAN communication unit, and the like. Information acquired by the location information sensor 15 is recorded on the auxiliary memory 13 or the like, for example, and transmitted to the server 30.

The illuminance sensor 16 acquires the illuminance inside or outside the first vehicle 10. The illuminance sensor 16 includes a circuit that detects a voltage or a current according to the illuminance by utilizing a photodiode or a phototransistor, for example. The illuminance sensor 16 is disposed at a position capable of detecting the illuminance correlated with the brightness felt by the driver of the first vehicle 10. Information acquired by the illuminance sensor 16 is recorded in the auxiliary memory 13 or the like, for example, and transmitted to the server 30. The illuminance sensor 16 is an example of the photodetector.

The second vehicle 20 includes a processor 21, a main memory 22, an auxiliary memory 23, a communication unit 24, a location information sensor 25, an input unit 26, an output unit 27, an interior light 28, and light-control glass 29. Those are mutually connected via a bus. The processor 21, the main memory 22, the auxiliary memory 23, the communication unit 24, and the location information sensor 25 of the second vehicle 20 are same as the processor 11, the main memory 12, the auxiliary memory 13, the communication unit 14, and the location information sensor 15 of the first vehicle 10, so that explanations thereof are omitted. The processor 21 is an example of the adjuster.

The input unit 26 is means for receiving input operations done by the user, and examples thereof may be a touch panel, a push button, a mouse, and a keyboard. The output unit 27 is means for presenting the information to the user, and examples thereof may be an LCD (Liquid Crystal Display), an EL (Electroluminescence) panel, a speaker, and a lamp. The input unit 26 and the output unit 27 may also be configured as a single touch panel display.

The interior light 28 is means for illuminating inside the second vehicle 20, and means for increasing the illuminance of light incident on the eyes of the driver of the second vehicle 20. Examples of the interior light 28 may be an LED lamp and a light bulb. The light-control glass 29 is glass capable of changing the transmittance of light, and is used for a windshield, side-window glass, rear-window glass, a sunroof, and the like of the second vehicle 20, for example. The light-control glass 29 is means for decreasing the illuminance of the light incident on the eyes of the driver of the second vehicle 20, and an example thereof may be electrochromic light-control glass. Note that the interior light 28 and the light-control glass 29 are examples of the changer.

Next, the server 30 will be described. The server 30 includes a processor 31, a main memory 32, an auxiliary memory 33, and a communication unit 34. Those are mutually connected via a bus. The processor 31, the main memory 32, the auxiliary memory 33, and the communication unit 34 of the server 30 are same as the processor 11, the main memory 12, the auxiliary memory 13, and the communication unit 14 of the first vehicle 10, so that explanations thereof are omitted. The processor 31 is an example of the "controller".

Note that a series of processing executed in the first vehicle 10, the second vehicle 20, or the server 30 may be executed by hardware but may also be executed by software. The hardware configurations of the first vehicle 10, the second vehicle 20, and the server 30 are not limited to those illustrated in FIG. 2.

(Functional Configuration: First Vehicle)

Figure 3:
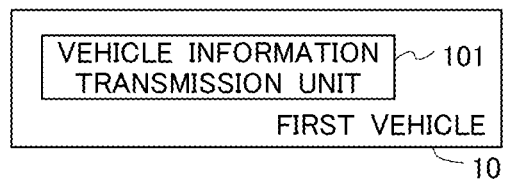
FIG. 3 is a diagram illustrating an example of a functional configuration of the first vehicle.

FIG. 3 is a diagram illustrating an example of the functional configuration of the first vehicle 10. The first vehicle 10 includes a vehicle information transmission unit 101 as a functional structural element. The vehicle information transmission unit 101 is a functional structural element that is provided by executing, by the processor 11 of the first vehicle 10, for example, various kinds of programs stored in the auxiliary memory 13.

The vehicle information transmission unit 101 transmits the location information acquired from the location information sensor 15 and the illuminance information acquired from the illuminance sensor 16, for example, to the server 30 via the communication unit 14. Hereinafter, the location information and the illuminance information transmitted to the server 30 from the vehicle information transmission unit 101 are also collectively referred to as "first vehicle information". The timing at which the vehicle information transmission unit 101 transmits the first vehicle information can be set as appropriate. For example, the first vehicle information may be transmitted regularly, may be transmitted at the timing of transmitting some other information to the server 30, or may be transmitted in response to a request from the server 30. The vehicle information transmission unit 101 transmits, to the server 30, the first vehicle information by associating it with identification information (vehicle ID) for identifying the own vehicle and the date/time on which the first vehicle information is acquired.

(Functional Configuration: Second Vehicle)

Figure 4:
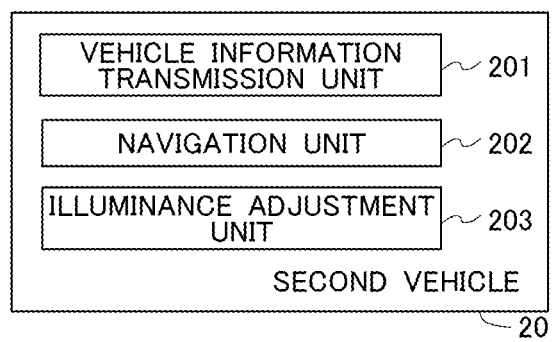
FIG. 4 is a diagram illustrating an example of a functional configuration of the second vehicle.

FIG. 4 is a diagram illustrating an example of the functional configuration of the second vehicle 20. The second vehicle 20 includes a vehicle information transmission unit 201, a navigation unit 202, and an illuminance adjustment unit 203 as functional structural elements. The vehicle information transmission unit 201, the navigation unit 202, and the illuminance adjustment unit 203 are the functional structural elements that are provided by executing, by the processor 21 of the second vehicle 20, for example, various kinds of programs stored in the auxiliary memory 23.

The vehicle information transmission unit 201 transmits, to the server 30 via the communication unit 14, the location information acquired from the location information sensor 25 and information regarding a traveling route (hereinafter, also referred to as traveling information) calculated by the navigation unit 202 to be described later, for example. Hereinafter, the location information and the traveling information transmitted to the server 30 from the vehicle information transmission unit 201 is also referred to as "second vehicle information". The timing at which the vehicle information transmission unit 201 transmits the second vehicle information can be set as appropriate. For example, the second vehicle information may be transmitted regularly, may be transmitted at the timing of transmitting some other information to the server 30, or may be transmitted in response to a request from the server 30. The vehicle information transmission unit 201 transmits, to the server 30, the second vehicle information by associating it with identification information (vehicle ID) for identifying the own vehicle and the date/time at which the second vehicle information is acquired.

The navigation unit 202 displays a map of the surroundings of the current location of the second vehicle 20 to the output unit 27 based on map information or the like stored in the auxiliary memory 23. Further, when the user inputs a destination via the input unit 26, the navigation unit 202 calculates a route to the destination (hereinafter, also referred to as a traveling route). Then, the navigation unit 202 guides the second vehicle 20 through the traveling route according to the calculated traveling route. The navigation unit 202 displays the map and the traveling route on a display and guides the traveling directions with voice according to the traveling route, for example. For the functions of the navigation unit 202, it is possible to use a known technique.

Upon receiving information regarding a sudden-change point from the server 30, the illuminance adjustment unit 203 executes processing according to the information. This processing is the processing for allowing in advance the eyes of the driver to be adapted to so that the driver does not feel dazzling or dimness at the sudden-change point. For example, when there is a point where the illuminance suddenly increases, a control is performed to increase the illuminance inside the second vehicle 20 before the second vehicle 20 passes through that point. For the control for increasing the illuminance, the illuminance adjustment unit 203 increases the brightness of the interior light 28, for example, so as to increase the total luminous flux of the interior light 28. At this time, the interior light 28 may be controlled such that the total luminous flux of the interior light 28 becomes gradually greater, that is, such that the interior light 28 becomes gradually brighter. Further, when gradually brightening the interior light 28, the brightness of the interior light 28 may be changed continuously or may be changed in stages. Further, the brightness of the interior light 28 may be changed only once. In such case, the interior light 28 in off-state may simply be turned on. Further, the brightness of the interior light 28 may be adjusted according to a change amount in the illuminance at the sudden-change point according to the illuminance after passing through the sudden-change point.

Further, when there is a point at which the illuminance is to suddenly drop, for example, a control is performed for decreasing the illuminance inside the second vehicle 20 before the second vehicle 20 passes through that point. For the control for decreasing the illuminance, the illuminance adjustment unit 203 changes the transmittance of the light-control glass 29 so that the transmittance of the light-control glass 29 is decreased. At this time, the light-control glass 29 may be controlled such that the transmittance of the light-control glass 29 is gradually decreased. Further, when gradually decreasing the transmittance of the light-control glass 29, the transmittance of the light-control glass 29 may be decreased continuously or may be decreased in stages. Further, the transmittance of the light-control glass 29 may be changed only once. Further, the transmittance of the light-control glass 29 may be adjusted according to a change amount in the illuminance at the sudden-change point or according to the illuminance after passing through the sudden-change point.

In a case where the illuminance adjustment unit 203 controls the interior light 28 or the light-control glass 29, the control may be started at the point where the distance from the second vehicle 20 to the sudden-change point reaches a prescribed distance. The prescribed distance may be defined as a distance necessary for allowing the eyes of the driver to be adapted to the brightness after the change at the sudden-change point. The prescribed distance may be changed according to the change amount of the illuminance at the sudden-change point. The prescribed distance may be acquired in advance by an experiment, a simulation, or the like. Note that an area from the point of place at the prescribed distance away from the sudden-change point to the sudden-change point is an example of a prescribed area. After the second vehicle 20 passes through the sudden-change point, the illuminance adjustment unit 203 returns the state of the interior light 28 or the light-control glass 29 to the state before the second vehicle 20 enters the prescribed area. Therefore, in a case where the change amount of the illuminance at the sudden-change point is a change amount on an increasing side, the illuminance adjustment unit 203 controls the illuminance inside the second vehicle 20 right before the second vehicle 20 passes through the sudden-change point to be higher than the illuminance before the second vehicle 20 enters the prescribed area. Therefore, the illuminance adjustment unit 203 increases the brightness of the interior light 28 before the second vehicle 20 passes through the sudden-change point to be higher than the brightness after the second vehicle 20 passes through the sudden-change point. In the meantime, in a case where the change amount of the illuminance at the sudden-change point is a change amount on a decreasing side, the illuminance adjustment unit 203 controls the illuminance inside the second vehicle 20 right before the second vehicle 20 passes through the sudden-change point to be lower than the illuminance that is before the second vehicle 20 enters the prescribed area. Therefore, the illuminance adjustment unit 203 decreases the transmittance of the light-control glass 29 before the second vehicle 20 passes through the sudden-change point than the transmittance that is after the second vehicle 20 passes through the sudden-change point.

(Functional Configuration: Server)

Figure 5:
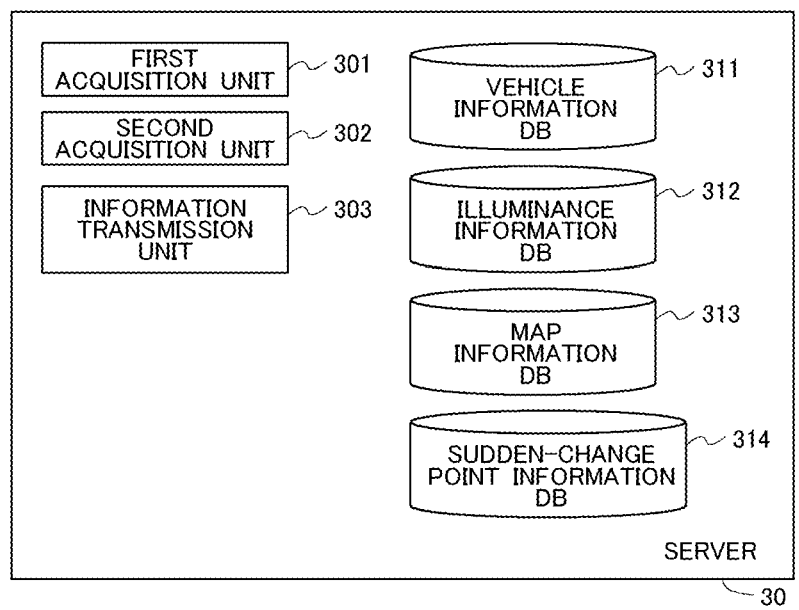
FIG. 5 is a diagram illustrating an example of a functional configuration of the server.

FIG. 5 is a diagram illustrating an example of the functional configuration of the server 30. The server 30 includes a first acquisition unit 301, a second acquisition unit 302, an information transmission unit 303, a vehicle information DB 311, an illuminance information DB 312, a map information DB 313, and a sudden-change point information DB 314 as functional structural elements. The first acquisition unit 301, the second acquisition unit 302, and the information transmission unit 303 are the functional structural elements provided by executing, by the processor 31 of the server 30, for example, various kinds of programs stored in the auxiliary memory 33.

The vehicle information DB 311, the illuminance information DB 312, the map information DB 313, and the sudden-change point information DB 314 are relational databases, for example, which are built by managing data stored in the auxiliary memory 33 by the program of a DBMS (Database Management System) executed by the processor 31. Note that one of each of the functional structural elements of the server 30 or part of the processing thereof may be executed by another computer connected to the network N1.

The first acquisition unit 301 manages various kinds of information regarding the first vehicle 10. The first acquisition unit 301 acquires and manages the first vehicle information (location information, the illuminance information) transmitted from the first vehicle 10, for example. The first acquisition unit 301 stores the first vehicle information in the illuminance information DB 312 by associating it with the vehicle ID and the date/time.

The second acquisition unit 302 manages various kinds of information regarding the second vehicle 20. The second acquisition unit 302 acquires and manages the second vehicle information (location information, the traveling information) transmitted from the second vehicle 20, for example. Further, the second acquisition unit 302 acquires information regarding the weather corresponding to the current location of the second vehicle 20. The second acquisition unit 302 may acquire the information regarding the weather corresponding to the current location of the second vehicle 20 from the second vehicle 20 or from a server that distributes weather data, for example. The second vehicle 20 may acquire the information regarding the weather by a sensor or from the server that distributes the weather data. The server 30 or the second vehicle 20 may acquire the information regarding the weather from another server based on the information regarding the location of the second vehicle 20, the traveling information, and the information regarding the date/time. The second acquisition unit 302 stores the second vehicle information in the vehicle information DB 311 by associating it with the vehicle ID, the date/time, and the weather.

The information transmission unit 303 transmits the information regarding the sudden-change point to the second vehicle 20. The information transmission unit 303 generates the information regarding the sudden-change point based on the information stored in the illuminance information DB 312. For example, by referring to the illuminance information DB 312, a point at which the change amount of the illuminance is equal to or more than a prescribed value within a prescribed distance on a same road is extracted as a sudden-change point. Then, the location (for example, the latitude and the longitude) of the sudden-change point, the change amount of the illuminance, the traveling direction along which the illuminance suddenly changes, the date/time, the weather, and the like are stored in the sudden-change point information DB 314. The traveling direction along which the illuminance suddenly changes is acquired from the time transition of the location information of the first vehicle 10, for example. The change amount of the illuminance is acquired by subtracting the illuminance before the change from the illuminance after the change.

Even when passing through the same point, the illuminance may vary if it is on different date/time. For example, even when passing through the same point in a same time zone, if the date or the season is different, the altitude and azimuth angle of the sun vary so that the illuminance may vary as well. Further, the state of leaves of the trees vary depending on the season, so that the illuminance may vary as well. Therefore, the information regarding the date/time is included in the information regarding the sudden-change point. The information regarding the date/time may be information regarding the season, month, date, time, and the like, for example. Further, the illuminance may vary depending on the weather. Therefore, the information transmission unit 303 acquires the information regarding the weather corresponding to the sudden-change point. Like the second vehicle 20, the information regarding the weather may be acquired by a sensor provided to the first vehicle 10 or may be acquired from the server that distributes weather data based on the information regarding the location of the sudden-change point and the information regarding the date/time. Note that the information regarding the weather may be acquired by the first acquisition unit 301 by associating it with the first vehicle information, when the first acquisition unit 301 acquires the first vehicle information.

Further, the information transmission unit 303 extracts the sudden-change point corresponding to the traveling date/time of the second vehicle 20, the traveling route, the traveling direction, and the weather on the traveling route based on the vehicle information DB 311 and the sudden-change point information DB 314. Further, the information transmission unit 303 transmits the information regarding the sudden-change point to the second vehicle 20. The information transmission unit 303 may transmit the information regarding the sudden-change point to the second vehicle 20 even if the sudden-change point is not on the traveling route of the second vehicle 20 but is near the second vehicle 20. For example, irrespective of whether or not there is a sudden-change point on the traveling route, the information transmission unit 303 may transmit information regarding all the sudden-change points existing within a prescribed area from the current location of the second vehicle 20 to the second vehicle 20. Further, irrespective of the traveling date/time of the second vehicle 20 and the weather thereof, when there is a sudden-change point existing on the traveling route of the second vehicle 20, the information transmission unit 303 may transmit the information regarding the sudden-change point to the second vehicle 20.

The vehicle information DB 311 is formed by storing the second vehicle information of the second vehicle 20 in the auxiliary memory 33, and the vehicle ID and the second vehicle information are linked therein. In the vehicle information DB 311, the information regarding the vehicle ID, time/date, location, traveling route, and weather is stored. The configuration of the second vehicle information stored in the vehicle information DB 311 will be described herein by referring to FIG. 6. FIG. 6 is a chart illustrating an example of the configuration of a table of the second vehicle information. The second vehicle information table includes each of fields of the vehicle ID, time/date, location, traveling route, and weather, for example. In the field of vehicle ID, identification information for specifying the second vehicle 20 is inputted. In the field of date/time, information regarding the date/time on which the second vehicle information is acquired is inputted. In the field of location, location information transmitted from the second vehicle 20 is inputted. In the field of traveling route, traveling information transmitted from the second vehicle 20 is inputted. In the field of weather, information regarding the weather corresponding to the location information of the second vehicle 20 is inputted.

The illuminance information DB 312 is formed by storing the first vehicle information described above in the auxiliary memory 33, and the vehicle ID and the first vehicle information are linked therein. The configuration of the first vehicle information stored in the illuminance information DB 312 will be herein described herein by referring to FIG. 7. FIG. 7 is a chart illustrating an example of the configuration of a table of the first vehicle information. The first vehicle information table includes each of fields of the vehicle ID, time/date, location, and illuminance, for example. In the field of vehicle ID, identification information for specifying the first vehicle 10 is inputted. In the field of date/time, information regarding the date/time on which the illuminance information is acquired is inputted. In the field of location, information regarding the location of the first vehicle 10 that has acquired the illuminance information is inputted. In the field of illuminance, information regarding the illuminance is inputted.

In the map information DB 313, stored is map information including map data and POI (Point of Interest) information such as characters, pictures, and the like indicating characteristics of each point of place on the map data. Note that the map information DB 313 may be provided from another system connected to the network N1, such as a GIS (Geographic Information System). The map data includes link data regarding roads (links), node data regarding node points, intersection data regarding each intersection, exploratory data for exploring routes, facility data regarding facilities, search data for searching point of places, and the like.

The sudden-change point information DB 314 is formed by storing the information indicating the sudden-change points in the auxiliary memory 33. FIG. 8 is a chart illustrating an example of the configuration of a table of the sudden-change point information. The sudden-change point information table includes each of fields of the sudden-change point ID, time/date, location, direction, change amount, and weather, for example. In the field of sudden-change point ID, information for specifying the sudden-change point is inputted. In the field of date/time, information regarding the date/time on which the sudden-change point is detected is inputted. In the field of date/time, information regarding the season, month, date, time, and the like, for example, may be inputted. In the field of location, information regarding the location of the sudden-change point is inputted. In the field of direction, information regarding the traveling direction along which the illuminance suddenly changes is inputted. In the field of change amount, the change amount in the illuminance at the sudden-change point is inputted. In the field of weather, information regarding the weather at the sudden-change point is inputted.

(Flow of Processing: System)

Figure 9:
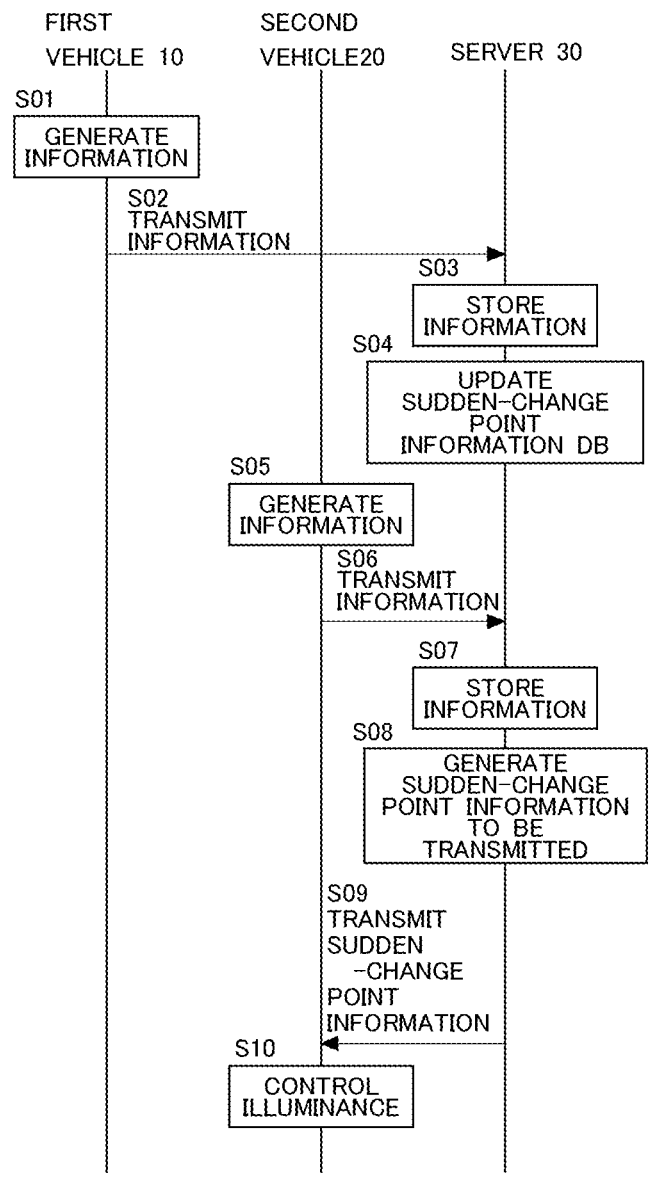
FIG. 9 is a sequence chart of processing of the system when the server provides information regarding a sudden-change point to the second vehicle.

Next, operations of the system 1 when generating an instruction will be described. FIG. 9 is a sequence chart of the processing of the system 1 when the server 30 provides the information regarding the sudden-change point to the second vehicle 20. Note that FIG. 9 illustrates an example of a case where there are a single first vehicle 10 and a single second vehicle 20.

The first vehicle 10 generates the first vehicle information such as the location information and the illuminance information by every prescribed time (processing of S01), and transmits the first vehicle information to the server 30 (processing of S02). The server 30 upon receiving the first vehicle information associates and stores the first vehicle information and the vehicle ID in the illuminance information DB 312 (processing of S03). The server 30 updates the sudden-change point information DB 314 based on the illuminance information stored in the illuminance information DB 312 (processing of S04). That is, when the illuminance information DB 312 is referred and there is found a sudden-change point, the information regarding the sudden-change point is inputted in the sudden-change point information DB 314. Further, the second vehicle 20 generates the second vehicle information such as the location information by every prescribed time (processing of S05), and transmits the second vehicle information to the server 30 (processing of S06). The server 30 upon receiving the second vehicle information associates and stores the second vehicle information and the vehicle ID in the vehicle information DB 311 (processing of S07).

Then, the server 30 generates the information regarding the sudden-change point to be transmitted to the second vehicle 20 based on the second vehicle information (processing of S08). The server 30 extracts the sudden-change point corresponding to the traveling date/time of the second vehicle 20, the traveling route, the traveling direction, and the weather on the traveling route based on the vehicle information DB 311 and the sudden-change point information DB 314. Further, the server 30 generates the information regarding the sudden-change point to be transmitted to the second vehicle 20. Then, after generating the information regarding the sudden-change point to be transmitted to the second vehicle 20, the server 30 transmits the information to the second vehicle 20 (processing of S09).

The second vehicle 20 upon receiving the information regarding the sudden-change point adjusts the illuminance of light incident on the eyes of the driver before reaching the point at which the illuminance is to suddenly change (processing of S10). For example, in a case where the illuminance increases at the sudden-change point, the illuminance inside the second vehicle 20 is gradually increased before passing through the sudden-change point. At this time, the brightness of the interior light 28 is gradually increased, for example. Then, the interior light 28 may be dimmed or the interior light 28 may be turned off after the second vehicle 20 passes through the sudden-change point, for example. On the contrary, in a case where the illuminance decreases at the sudden-change point, for example, the illuminance inside the second vehicle 20 is gradually decreased before passing through the sudden-change point. At this time, the transmittance of the light-control glass 29 is gradually decreased, for example. Then, the transmittance of the light-control glass 29 may be increased or the transmittance of the light-control glass 29 may be maximized after the second vehicle 20 passes through the sudden-change point, for example.

(Flow of Processing: Server)

Figure 10:
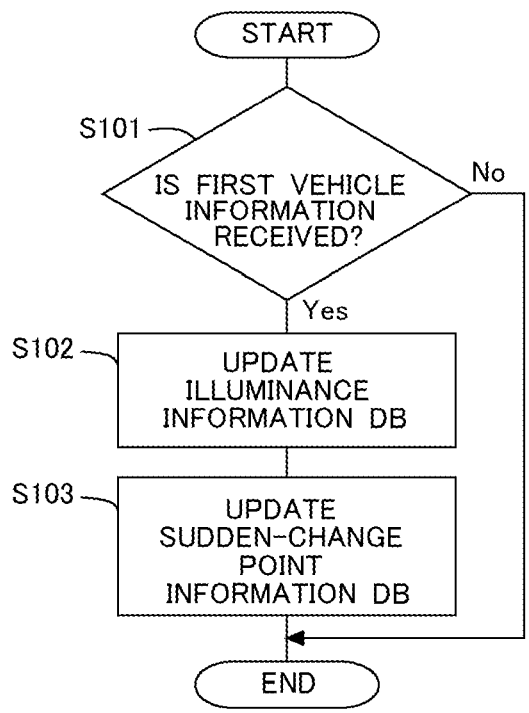
FIG. 10 is a flowchart illustrating an example of processing of the server when the server generates sudden-change point information DB based on the first vehicle information of the first vehicle.

Next, the processing of the server 30 according to the first embodiment will be described by referring to FIG. 10 and FIG. 11. FIG. 10 is a flowchart illustrating an example of the processing of the server 30 when the server 30 generates the sudden-change point information DB 314 based on the first vehicle information of the first vehicle 10. The processing illustrated in FIG. 10 is executed by the processor 31 by every prescribed time (for example, at specific intervals).

In step S101, it is determined whether or not the first acquisition unit 301 has received the first vehicle information from the first vehicle 10. The processing is shifted to step S102 when determined positive in step S101, while the routine is ended when determined negative in step S101. In step S102, the first acquisition unit 301 updates the illuminance information DB 312 based on the first vehicle information acquired from the first vehicle 10. That is, the first vehicle information is stored in the illuminance information DB 312. In step S103, the information transmission unit 303 updates the sudden-change point information DB 314 based on the information stored in the illuminance information DB 312. While the same first vehicle 10 is traveling a prescribed distance, for example, the information transmission unit 303 extracts, from the illuminance information DB 312, the point at which the absolute value of the change amount of the illuminance exceeds a prescribed value as the sudden-change point. Note that the change amount of the illuminance may be defined as a positive value when increasing along the traveling direction of the first vehicle 10, and may be defined as a negative value when decreasing therealong. Further, the information transmission unit 303 acquires the information regarding the weather corresponding to the extracted sudden-change point. The information transmission unit 303 stores the information regarding the sudden-change point in the sudden-change point information DB 314 to update the sudden-change point information DB 314 thereby.

Figure 11:
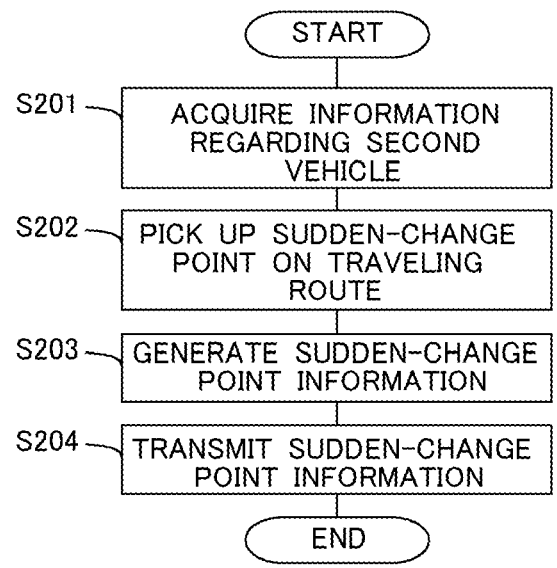
FIG. 11 is a flowchart illustrating an example of processing of the server when the server transmits information indicating a sudden-change point to the second vehicle.

Next, FIG. 11 is a flowchart illustrating an example of the processing of the server 30 when the server 30 transmits the information regarding the sudden-change point to the second vehicle 20. The processing illustrated in FIG. 11 is executed by the processor 31 by every prescribed time (for example, at specific intervals). The processing illustrated in FIG. 11 is executed for each of the second vehicles 20. It is assumed that the vehicle information DB 311 and the sudden-change point information DB 314 are generated before executing this routine.

In step S201, the information transmission unit 303 acquires the information corresponding to the second vehicle 20 from the vehicle information DB 311. In step S202, the information transmission unit 303 refers to the sudden-change point information DB 314 and extracts the sudden-change point that is located on the traveling route of the second vehicle 20 and detected in the same time zone and the same weather. As for the time zone, it may be defined as the time during which the illuminance is substantially the same. As for the weather, it may be defined as the weather under which the illuminance is substantially the same. Then, in step S203, the information transmission unit 303 generates the information regarding the sudden-change point to be transmitted to the second vehicle 20. Then, in step S204, the information transmission unit 303 transmits the generated sudden-change point information to the second vehicle 20.

(Flow of Processing: First Vehicle)

Figure 12:
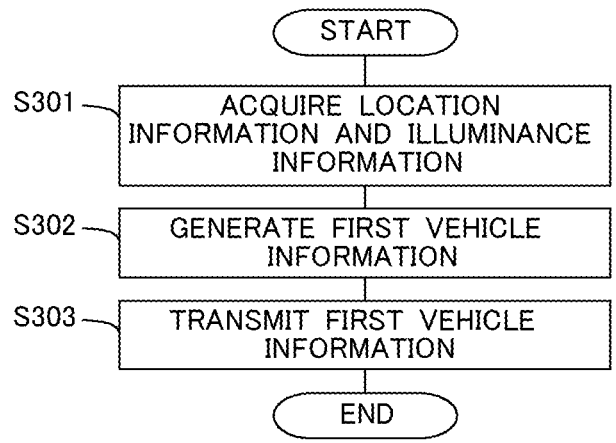
FIG. 12 is a flowchart illustrating a flow of processing performed by the first vehicle.

Next, the processing of the first vehicle 10 will be described by referring to FIG. 12. FIG. 12 is a flowchart illustrating a flow of the processing performed in the first vehicle 10. The processing illustrated in FIG. 12 is executed by the processor 11 by every prescribed time (for example, at specific intervals).

In step S301, the vehicle information transmission unit 101 acquires the location information and the illuminance information. The location information is acquired by the location information sensor 15. The illuminance information is acquired by the illuminance sensor 16. In step 302, the vehicle information transmission unit 101 generates the first vehicle information including the location information and the illuminance information. The vehicle information transmission unit 101 generates the first vehicle information by associating the location information as well as the illuminance information with the date/time on which the information is acquired and the vehicle ID. Then, in step S303, the vehicle information transmission unit 101 transmits the generated first vehicle information to the server 30.

(Flow of Processing: Second Vehicle)

Figure 13:
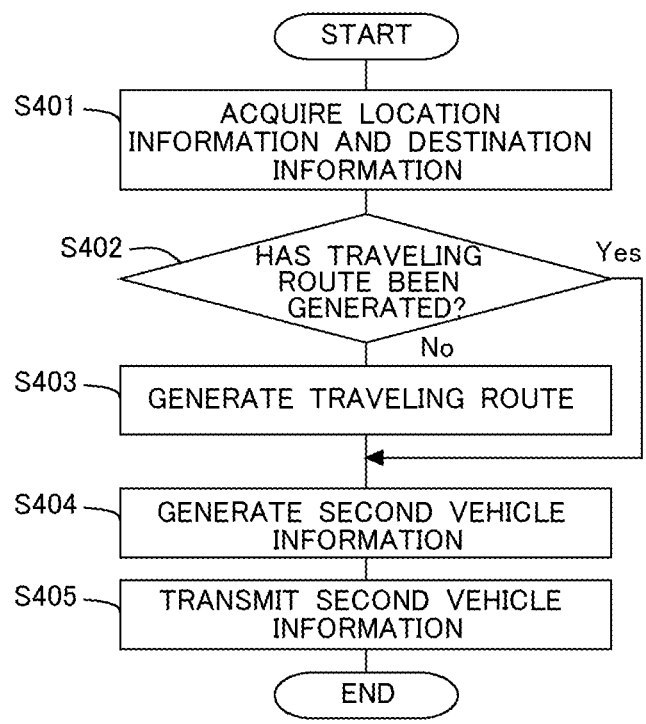
FIG. 13 is a flowchart illustrating a flow of processing when transmitting the second vehicle information from the second vehicle.

Next, the processing of the second vehicle 20 will be described by referring to FIG. 13 and FIG. 14. FIG. 13 is a flowchart illustrating a flow of the processing when the second vehicle information is transmitted from the second vehicle 20. The processing illustrated in FIG. 13 is executed by the processor 21 by every prescribed time (for example, at specific intervals).

In step S401, the vehicle information transmission unit 201 acquires location information and destination information. The location information is acquired by the location information sensor 15. The destination information is the information regarding the destination of the second vehicle 20, which is the information regarding the destination inputted by the user on the input unit 26. In step S402, the navigation unit 202 determines whether or not the traveling route has been generated. For example, when a traveling route is guided by the navigation unit 202, it is determined that the traveling route has been generated. In the meantime, when no traveling route is guided by the navigation unit 202, it is determined that no traveling route has been generated. The processing is shifted to step S404 when determined positive in step S402, while the processing is shifted to step S403 when determined negative.

In step S403, the navigation unit 202 generates the traveling route of the second vehicle 20. The navigation unit 202 generates the traveling route from the current location and the destination of the second vehicle 20. The traveling route may be generated such that the traveling distance becomes the shortest or such that the traveling time becomes the shortest, for example. In step S404, the vehicle information transmission unit 201 generates the second vehicle information including the location information and the traveling route information. The vehicle information transmission unit 201 generates the second vehicle information by associating the location information as well as the traveling route information with the date/time on which the location information is acquired and the vehicle ID. Then, in step S405, the vehicle information transmission unit 201 transmits the generated second vehicle information to the server 30.

Figure 14:
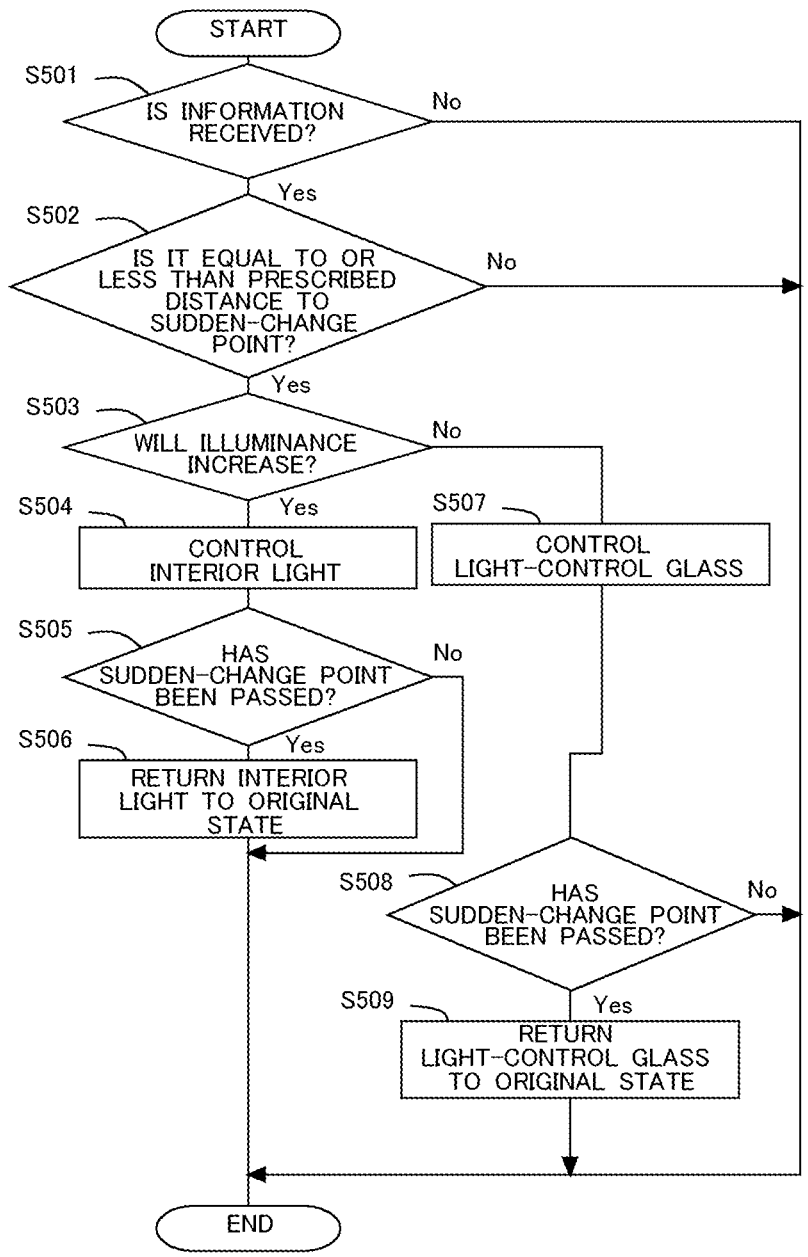
FIG. 14 is a flowchart illustrating a flow of processing when adjusting the brightness of the interior of the second vehicle.

Next, FIG. 14 is a flowchart illustrating a flow of the processing for adjusting the brightness inside the second vehicle 20. The processing illustrated in FIG. 14 is executed by the processor 21 by every prescribed time (for example, at specific intervals).

In step S501, the illuminance adjustment unit 203 determines whether or not the information regarding the sudden-change point has been received from the server 30. The processing is shifted to step S502 when determined positive in step S501, while the routine is ended when determined negative. In step S502, the illuminance adjustment unit 203 determines whether or not the current location of the second vehicle 20 is at a distance equal to or less than a prescribed distance to the sudden-change point. The prescribed distance is the distance from the point of place at which the brightness inside the second vehicle 20 is started to change to the sudden-change point. The prescribed distance is set as the distance that is necessary for the eyes of the driver to be adapted to the illuminance suddenly changed at the sudden-change point. The prescribed distance may be set according to a difference or a ratio between the illuminance after the change and the illuminance before the change. Further, the prescribed distance may be a fixed value. Furthermore, the prescribed distance may be acquired by an experiment, a simulation, or the like. The processing is shifted to step S503 when determined positive in step S502, while the routine is ended when determined negative.

In step S503, the illuminance adjustment unit 203 determines whether or not the illuminance increases at the sudden-change point that is at the prescribed distance from the current location. The illuminance increases when the change amount of the illuminance at the sudden-change point is a positive value, and the illuminance decreases when it is a negative value. The processing is shifted to step S504 when determined positive in step S503, while the processing is shifted to step S507 when determined negative.

In step S504, the illuminance adjustment unit 203 controls the interior light 28. For example, by gradual increasing the brightness of the interior light 28, the driver becomes not likely to feel dazzling at the sudden-change point. In this case, the increase amount of the brightness per unit time may be set based on the change amount of the illuminance at the sudden-change point or the illuminance after passing through the sudden-change point, for example. Further, instead of gradually increasing the brightness of the interior light 28, the illuminance adjustment unit 203 may simply turn on the interior light 28, for example. Then, in step S505, the illuminance adjustment unit 203 determines whether or not the second vehicle 20 has passed the sudden-change point based on the location information of the second vehicle 20 and the location information of the sudden-change point. The processing is shifted to step S506 when determined positive in step S505, while the routine is ended when determined negative. Then, in step S506, the illuminance adjustment unit 203 returns the interior light 28 to the original state. That is, the state of the interior light 28 is returned to the state before determined positive in step S502. For example, the illuminance adjustment unit 203 dims the interior light 28 or turn off the interior light 28.

In the meantime, in step S507, the illuminance adjustment unit 203 controls the light-control glass 29. For example, by gradually decreasing the transmittance of the light-control glass 29, the driver becomes not likely to feel dimness at the sudden-change point. In this case, the decrease amount of the transmittance per unit time may be set based on the change amount of the illuminance at the sudden-change point or the illuminance after passing through the sudden-change point, for example. Further, instead of gradually decreasing the transmittance of the light-control glass 29, the transmittance of the light-control glass 29 may simply be decreased by a prescribed value, for example. The prescribed value may be set based on the change amount of the illuminance at the sudden-change point or the illuminance after passing through the sudden-change point. Then, in step S508, the illuminance adjustment unit 203 determines whether or not the second vehicle 20 has passed the sudden-change point based on the location information of the second vehicle 20 and the location information of the sudden-change point. The processing is shifted to step S509 when determined positive in step S508, while the routine is ended when determined negative. Then, in step S509, the illuminance adjustment unit 203 returns the light-control glass 29 to the original state. That is, the transmittance of the light-control glass 29 is returned to the state before determined positive in step S502. For example, the illuminance adjustment unit 203 increases the transmittance of the light-control glass 29 or maximizes the transmittance of the light-control glass 29.

As described above, according to the embodiment, the brightness inside the second vehicle 20 is changed according to the illuminance at the sudden-change point before the second vehicle 20 passes through the sudden-change point, so that the driver is not likely to feel dazzling or dimness at the sudden-change point.

Second Embodiment

Figure 15:
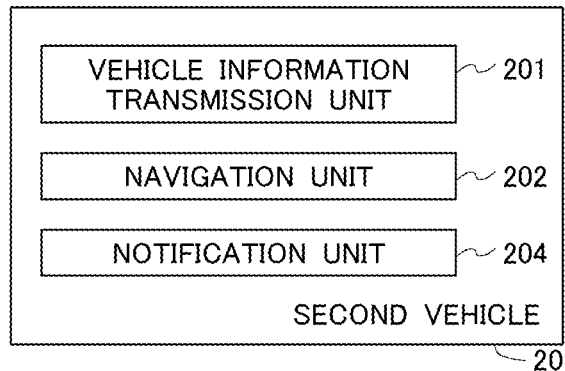
FIG. 15 is a diagram illustrating an example of a functional configuration of the second vehicle according to a second embodiment.

FIG. 15 is a diagram illustrating an example of the functional configuration of the second vehicle 20 according to the embodiment. In the embodiment, there is a notification unit 204 provided for notifying the sudden-change point instead of the illuminance adjustment unit 203. That is, the second vehicle 20 includes the vehicle information transmission unit 201, the navigation unit 202, and the notification unit 204 as the functional structural elements. The vehicle information transmission unit 201, the navigation unit 202, and the notification unit 204 are the functional structural elements provided by executing, by the processor 21 of the second vehicle 20, for example, various kinds of programs stored in the auxiliary memory 23. The vehicle information transmission unit 201 and the navigation unit 202 are same as those of the first embodiment, so that explanations thereof are omitted.

The notification unit 204 may display the sudden-change point on the map outputted to the output unit 27 by the navigation unit 202, for example. Further, the notification unit 204 may notify that the illuminance suddenly changes by sound, warning light, or the like before reaching the sudden-change point, for example. Such processing is executed instead of illuminance control in S10 of the sequence chart illustrated in FIG. 9.

Figure 16:
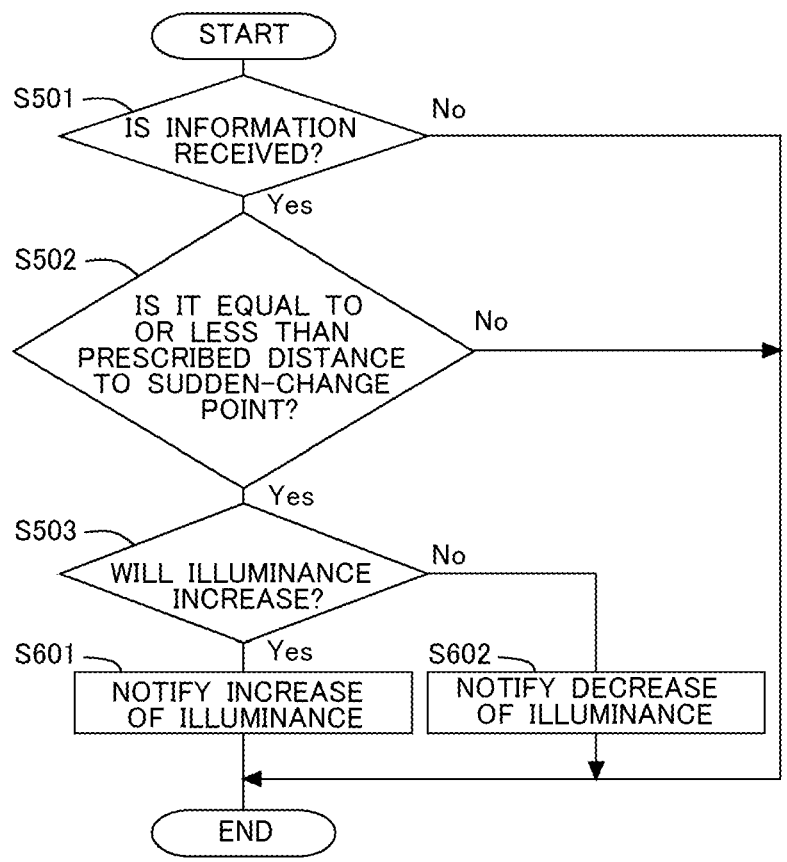
FIG. 16 is a flowchart illustrating a flow of processing when notifying a sudden change in illuminance in the second vehicle.

Next, by referring to FIG. 16, the processing in the second vehicle 20 will be described. FIG. 16 is a flowchart illustrating a flow of the processing performed in the second vehicle 20 for notifying a sudden change in the illuminance. The processing illustrated in FIG. 16 is executed by the processor 21 by every prescribed time (for example, at specific intervals). In FIG. 16, same reference signs are applied to steps that perform the processing same as the processing in the flowchart illustrated in FIG. 14, and explanations thereof are omitted.

In the flowchart illustrated in FIG. 16, the processing is shifted to step S601 when determined positive instep S503, while the processing is shifted to step S602 when determined negative. In step S601, the notification unit 204 notifies that the illuminance will increase. In the meantime, in step S602, the notification unit 204 notifies that the illuminance will decrease. Note that the prescribed distance in step S502 may be the same value as that of the first embodiment or may be a different value.

When the current location of the second vehicle 20 approaches a location that is at the prescribed distance from the sudden-change point, for example, the information transmission unit 303 of the server 30 may transmit, to the second vehicle 20, the information indicating that there is the sudden-change point. The information indicating that there is the sudden-change point may include information such as "direct sunlight makes incident from the front at point X on a sunny winter afternoon" in addition to the information regarding the illuminance, for example. In the second vehicle 20 upon receiving such information, the notification unit 204 may output the information via the output unit 27, for example.

Further, the second vehicle 20 may also include both of the illuminance adjustment unit 203 and the notification unit 204. That is, while adjusting the illuminance inside the second vehicle 20 before reaching the sudden-change point, the user may also be notified that the illuminance suddenly changes.

As described, by simply notifying it to the user, it is possible for the user to prepare for the sudden change of the illuminance.

Other Embodiments

The embodiments described above are simply examples, and the present disclosure can be performed by applying changes as appropriate within a scope not departing from the gist thereof. While the server 30 includes the first acquisition unit 301, the second acquisition unit 302, the information transmission unit 303, the vehicle information DB 311, the illuminance information DB 312, the map information DB 313, and the sudden-change point information DB 314 in the embodiments described above, a part of or a whole part of those functional structural elements may be included in the first vehicle 10 or the second vehicle 20. For example, the information stored in the sudden-change point information DB 314 may be generated in the first vehicle 10. That is, the first vehicle 10 may extract a point at which the change amount of the illuminance is equal to or more than a prescribed value within a prescribed distance on a same road as a sudden-change point, and may transmit the location (latitude and longitude) of the sudden-change point, the change amount of the illuminance, the traveling direction along which the illuminance suddenly changes, and the like to the server 30.

Further, for example, the illuminance adjustment unit 203 may be provided to the server 30. That is, the server 30 may generate instructions to control the interior light 28 and the light-control glass 29, and transmit the instructions to the second vehicle 20.

Further, while the first vehicle 10 includes the illuminance sensor 16 as a photodetector and acquires the illuminance by the illuminance sensor 16 in the embodiments described above, the first vehicle 10 may include a camera instead and acquire the illuminance based on images captured by the camera. For example, in a case where the sun is located in the front direction of the vehicle and the sunlight makes incident on the inside of the vehicle, it may be better to acquire the illuminance by the camera than acquiring the illuminance by the illuminance sensor 16. The camera captures images by using, for example, an imaging element such as a CCD (Charged Coupled Device) image sensor, a CMOS (Complementary Metal Oxide Semiconductor) image sensor, or the like. The camera is disposed at a position capable of capturing the images correlated with the brightness felt by the driver of the first vehicle 10. For example, the camera is disposed to capture the front direction of the first vehicle 10. The image may be a still image or a video. Note that the first vehicle 10 may include at least one of the illuminance sensor 16 and the camera. Further, while the illuminance is acquired by the illuminance sensor 16 in the embodiments described above, other physical quantities related to the illuminance may be acquired instead.

Furthermore, while the brightness inside the second vehicle 20 is adjusted in the embodiments described above for both cases where the illuminance increases and the illuminance decreases, the brightness inside the second vehicle 20 may be adjusted instead for either case where the illuminance increases or the illuminance decreases.

Further, for example, at least a part of the controller of the present disclosure may be the processor 11 of the first vehicle 10 or the processor 21 of the second vehicle 20.

The processing and means described in the present disclosure can be performed in combination as appropriate as long as there is no technical confliction generated thereby.

Further, the processing described to be executed by a single device may be allotted to be executed by a plurality of devices. Alternatively, the processing described to be executed by different devices may be executed by a single device. In a computer system, it is possible to flexibly change which hardware configuration (server configuration) is to execute each of the functions.

The present disclosure can also be achieved by supplying a computer program loading the functions described in the above embodiments to a computer, and by reading out and executing the program by one or more processors provided to the computer. Such computer program may be provided to the computer via a non-transitory computer readable storage medium connectable to a system bus of the computer or may be provided to the computer via a network. Examples of the non-transitory computer readable storage medium may be magnetic disks (a Floppy® disk, a hard disk drive (HDD), and the like), any types of discs such as optical discs (a CD-ROM, a DVD disc, a Blu-ray® disc, and the like), a read-only memory (ROM), a random access memory (RAM), a EPROM, an EEPROM, a magnetic card, a flash memory, an optical card, and any types of media suited for storing electronic instructions.

What is claimed is:

1. A system, comprising:
a first vehicle configured to output, to a server, information regarding illuminance of light incident on the first vehicle that is associated with information regarding a traveling environment, the information regarding the traveling environment of the first vehicle including information regarding a location of the first vehicle, information regarding date/time on which the information regarding the location of the first vehicle is acquired, and information regarding weather corresponding to the location of the first vehicle;
a second vehicle configured to output information regarding a traveling environment to the server, the information regarding the traveling environment of the second vehicle including information regarding a location of the second vehicle, information regarding a traveling route of the second vehicle, information regarding date/time on which the information regarding the location of the second vehicle is acquired, and information regarding weather corresponding to the location of the second vehicle; and
the server comprising:
a memory; and
a controller configured to:
acquire, from the first vehicle, the information regarding illuminance associated with the information regarding the traveling environment of the first vehicle;
store, in the memory, the information regarding illuminance associated with the information regarding the traveling environment of the first vehicle;
extract, based on the information regarding illuminance of the first vehicle, a sudden-change point that is a point at which a change amount of the illuminance of the light incident on the first vehicle exceeds a prescribed value;
generate, based on the information regarding the traveling environment of the first vehicle, notification information regarding sudden-change point about the sudden-change point, the notification information regarding sudden-change point including a location of the sudden-change point, a travelling direction when the change amount of the illuminance exceeds the prescribed value at the sudden-change point, date/time when the change amount of the illuminance exceeds the prescribed value at the sudden-change point, and weather when the change amount of the illuminance exceeds the prescribed value at the sudden-change point;
store, in the memory, the notification information regarding sudden-change point;
after the notification information regarding sudden-change point is stored in the memory, acquire, from the second vehicle, the information regarding the traveling environment of the second vehicle;
extract, from the memory based on the information regarding the traveling environment of the second vehicle, the notification information regarding sudden-change point about the sudden-change point located on the travelling route of the second vehicle, the extracted notification information regarding sudden-change point corresponding to a travelling direction of the second vehicle to be predicted when the second vehicle passes through the sudden-change point, a travelling day/time of the second vehicle to be predicted when the second vehicle passes through the sudden-change point, and weather on the traveling route of the second vehicle; and
output, the notification information regarding sudden-change point extracted from the memory to the second vehicle.

2. The system according to claim 1, wherein the second vehicle comprises:

a changer configured to change illuminance inside the second vehicle; and
an adjuster configured to control the changer based on the information regarding the sudden-change point outputted by the server.

3. The system according to claim 2, wherein the adjuster controls the changer to change the illuminance inside the second vehicle in a prescribed area before the second vehicle passes through the sudden-change point, and controls the changer to return to a state of the changer before the second vehicle enters the prescribed area after the second vehicle passes through the sudden-change point.

4. The system according to claim 3, wherein, in a case where the change amount at the sudden-change point is a change amount on an increasing side, the adjuster controls the changer such that the illuminance inside the second vehicle before the second vehicle passes through the sudden-change point in the prescribed area becomes higher than the illuminance before the second vehicle enters the prescribed area.

5. The system according to claim 2, wherein, in a case where the change amount at the sudden-change point is a change amount on an increasing side, the adjuster controls the changer such that the illuminance inside the second vehicle gradually increases before the second vehicle passes through the sudden-change point.

6. The system according to claim 2, wherein the changer includes an interior light configured to illuminate inside the second vehicle.

7. The system according to claim 6, wherein, in a case where the change amount at the sudden-change point is a change amount on an increasing side, the adjuster turns on the interior light before the second vehicle passes through the sudden-change point.

8. The system according to claim 6, wherein the adjuster turns off the interior light after the second vehicle passes through the sudden-change point.

9. The system according to claim 3, wherein, in a case where the change amount at the sudden-change point is a change amount on a decreasing side, the adjuster controls the changer such that the illuminance inside the second vehicle before the second vehicle passes through the sudden-change point in the prescribed area becomes lower than the illuminance before the second vehicle enters the prescribed area.

10. The system according to claim 2, wherein, in a case where the change amount at the sudden-change point is a change amount on a decreasing side, the adjuster controls the changer such that the illuminance inside the second vehicle gradually decreases before the second vehicle passes through the sudden-change point.

11. The system according to claim 2, wherein the changer includes light-control glass.

12. The system according to claim 11, wherein, in a case where the change amount at the sudden-change point is a change amount on a decreasing side, the adjuster controls transmittance of the light-control glass before the second vehicle passes through the sudden-change point to be smaller than the transmittance after the second vehicle passes through the sudden-change point.

13. The system according to claim 11, wherein the adjuster maximizes transmittance of the light-control glass after the second vehicle passes through the sudden-change point.

14. The system according to claim 1, wherein the second vehicle comprises an output unit configured to output the information regarding the sudden-change point upon acquiring the information regarding the sudden-change point.

15. The system according to claim 1, wherein the first vehicle comprises a photodetector configured to detect the light incident on the first vehicle.

16. An information processing apparatus comprising:
a memory; and
a controller configured to:
    acquire, from a first vehicle, information regarding illuminance of light incident on the first vehicle associated with information regarding a traveling environment, the information regarding the traveling environment of the first vehicle including information regarding a location of the first vehicle, information regarding date/time on which the information regarding the location of the first vehicle is acquired, and information regarding weather corresponding to the location of the first vehicle;
    store, in the memory, the information regarding illuminance associated with the information regarding the traveling environment of the first vehicle;
    extract, based on the information regarding illuminance of the first vehicle, a sudden-change point that is a point at which a change amount of the illuminance of the light incident on the first vehicle exceeds a prescribed value;
    generate, based on the information regarding the traveling environment of the first vehicle, notification information regarding sudden-change point about the sudden-change point, the notification information regarding sudden-change point including a location of the sudden-change point, a travelling direction when the change amount of the illuminance exceeds the prescribed value at the sudden-change point, date/time when the change amount of the illuminance exceeds the prescribed value at the sudden-change point, and weather when the change amount of the illuminance exceeds the prescribed value at the sudden-change point;
    store, in the memory, the notification information regarding sudden-change point;
    after the notification information regarding sudden-change point is stored in the memory, acquire, from a second vehicle, information regarding a traveling environment, the information regarding the traveling environment of the second vehicle including information regarding a location of the second vehicle, information regarding a traveling route of the second vehicle, information regarding date/time on which the information regarding the location of the second vehicle is acquired, and information regarding weather corresponding to the location of the second vehicle;
    extract, from the memory based on the information regarding the traveling environment of the second vehicle, the notification information regarding sudden-change point about the sudden-change point located on the travelling route of the second vehicle, the extracted notification information regarding sudden-change point corresponding to a travelling direction of the second vehicle to be predicted when the second vehicle passes through the sudden-change point, a travelling day/time of the second vehicle to be predicted when the second vehicle passes through the sudden-change point, and weather on the traveling route of the second vehicle; and output, the notification information regarding sudden-change point extracted from the memory to the second vehicle.

17. A non-transitory computer-readable storage medium comprising a program stored therein, the program causing a computer to:
acquire, from a first vehicle, information regarding illuminance of light incident on the first vehicle associated with information regarding a traveling environment, the information regarding the traveling environment of the first vehicle including information regarding a location of the first vehicle, information regarding date/time on which the information regarding the location of the first vehicle is acquired, and information regarding weather corresponding to the location of the first vehicle;
store, in a memory of the computer, the information regarding illuminance associated with the information regarding the traveling environment of the first vehicle;
extract, based on the information regarding illuminance of the first vehicle, a sudden-change point that is a point at which a change amount of the illuminance of the light incident on the first vehicle exceeds a prescribed value;
generate, based on the information regarding the traveling environment of the first vehicle, notification information regarding sudden-change point about the sudden-change point, the notification information regarding sudden-change point including a location of the sudden-change point, a travelling direction when the change amount of the illuminance exceeds the prescribed value at the sudden-change point, date/time when the change amount of the illuminance exceeds the prescribed value at the sudden-change point, and weather when the change amount of the illuminance exceeds the prescribed value at the sudden-change point;
store, in the memory, the notification information regarding sudden-change point;
after the notification information regarding sudden-change point is stored in the memory, acquire, from a second vehicle, information regarding a traveling environment, the information regarding the traveling environment of the second vehicle including information regarding a location of the second vehicle, information regarding a traveling route of the second vehicle, information regarding date/time on which the information regarding the location of the second vehicle is acquired, and information regarding weather corresponding to the location of the second vehicle;
extract, from the memory based on the information regarding the traveling environment of the second vehicle, the notification information regarding sudden-change point about the sudden-change point located on the travelling route of the second vehicle, the extracted notification information regarding sudden-change point corresponding to a travelling direction of the second vehicle to be predicted when the second vehicle passes through the sudden-change point, a travelling day/time of the second vehicle to be predicted when the second vehicle passes through the sudden-change point, and weather on the traveling route of the second vehicle; and
output, the notification information regarding sudden-change point extracted from the memory to the second vehicle.

* * * * *